United States Patent
Gonno (10) Patent No.: US 6,404,739 B1
(45) Date of Patent: Jun. 11, 2002

(54) TRANSMITTER AND TRANSMITTING METHOD, RECEIVER AND RECEIVING METHOD, AND TRANSCEIVER AND TRANSMITTING/RECEIVING METHOD

(75) Inventor: Yoshihisa Gonno, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/067,999

(22) Filed: Apr. 28, 1998

(30) Foreign Application Priority Data

Apr. 30, 1997 (JP) .............................................. 9-112180

(51) Int. Cl.⁷ .............................................. H04L 12/26
(52) U.S. Cl. ........................................ 370/236; 370/410
(58) Field of Search ................................. 370/389, 394, 370/398, 410, 422, 425, 426, 432, 473, 235, 236; 714/748, 749, 750, 751

(56) References Cited

U.S. PATENT DOCUMENTS

| | | | |
|---|---|---|---|
| 4,888,767 A | * 12/1989 | Furuya et al. ............... | 370/243 |
| 5,161,194 A | * 11/1992 | Ujiie ........................... | 380/48 |
| 5,553,083 A | 9/1996 | Miller ......................... | 371/32 |
| 5,572,678 A | * 11/1996 | Homma et al. ............. | 709/227 |
| 5,625,818 A | 4/1997 | Zarmer et al. .............. | 395/615 |
| 5,801,750 A | 9/1998 | Kurihara ....................... | 348/7 |
| 5,815,666 A | 9/1998 | Kurihara ................ | 395/200.61 |
| 5,818,911 A | 10/1998 | Kawashima ............. | 379/90.01 |
| 6,031,818 A | * 2/2000 | Lo et al. ...................... | 370/216 |

FOREIGN PATENT DOCUMENTS

| | | | |
|---|---|---|---|
| EP | 0465804 A2 | 1/1992 | ......... G06F/15/403 |
| JP | 4-230541 | 8/1992 | ........... G06F/12/00 |
| JP | 9-224230 | 8/1997 | ............ H04N/7/16 |
| WO | WO 88/04496 | 6/1988 | ............. H04L/1/12 |
| WO | 97/10558 | 3/1997 | ........... G06F/17/30 |

OTHER PUBLICATIONS

U.S. application No. 09/296,073, filed Apr. 21, 1999, pending.
U.S. application No. 09/238,971, filed Jan. 27, 1999, pending.
U.S. application No. 09/069,674, filed Apr. 29, 1998, pending.
U.S. application No. 08/763,893, filed Dec. 11, 1996, pending.
M. Aghadavoodi Jolfaei Et Al., "Improved Selective Repeat ARQ Schemes for Data Communication," vol. 3, Conf. 44, IEEE Proceedings of the Vehicular Technology Conference, Stockholm, Jun. 8–10, 1994, pp. 1407–1411.
N. Samaraweera Et Al., "Explicit Loss Indication and Accurate RTO Estimation for TCP Error Recovery Using Satellite Links," IEE Proceedings: Communications, vol. 144, No. 1, Feb. 1997, pp. 47–53.

* cited by examiner

*Primary Examiner*—Kwang Bin Yao
(74) *Attorney, Agent, or Firm*—Sonnenschein, Nath & Rosenthal

(57) ABSTRACT

A transmitter transmits data via a broadcasting link consisting of a satellite link. Receivers receive the data, and verify whether they have successfully received the data. Only when having failed to successfully receive the data, some of the receivers, which can transmit information to the transmitter, transmit retransmission requests for requesting the retransmission of the data via a communication link consisting of the Internet. When retransmission requests are transmitted, the transmitter receives only the retransmission requests and totals them. In addition, the transmitter transmits the data requested to be retransmitted, based on the total via the broadcasting link. The receivers receive the retransmitted data.

25 Claims, 9 Drawing Sheets

TRANSMITTER AND TRANSMITTING METHOD, RECEIVER AND RECEIVING METHOD, AND TRANSCEIVER AND TRANSMITTING/RECEIVING METHOD

BACKGROUND OF THE INVENTION

1. Field of the Invention

The present invention relates to transmitters and transmitting methods, receivers and receiving methods, and transceivers and transmitting/receiving methods, and in particular, for example, to a transmitter and transmitting method, a receiver and receiving method, and a transceiver and transmitting/receiving method which enable the efficient and highly reliable distribution of data to a plurality of users.

2. Description of the Related Art

Methods for efficiently distributing data to a plurality of users include, for example, teletext for transmitting data such as characters, together with images and sound, by using so-called "broadcasting transmission media", such as terrestrial signals, a satellite link, and a CATV network.

In addition, techniques have been recently proposed in which data are efficiently distributed to a plurality of users by using, for example, the Internet etc. which uses a computer network and not a broadcasting transmission medium.

For example, techniques for efficiently distributing data to a plurality of users in the Internet include one called "Internet protocol (IP) multicast" for multiple broadcasting of data.

Figure 8:
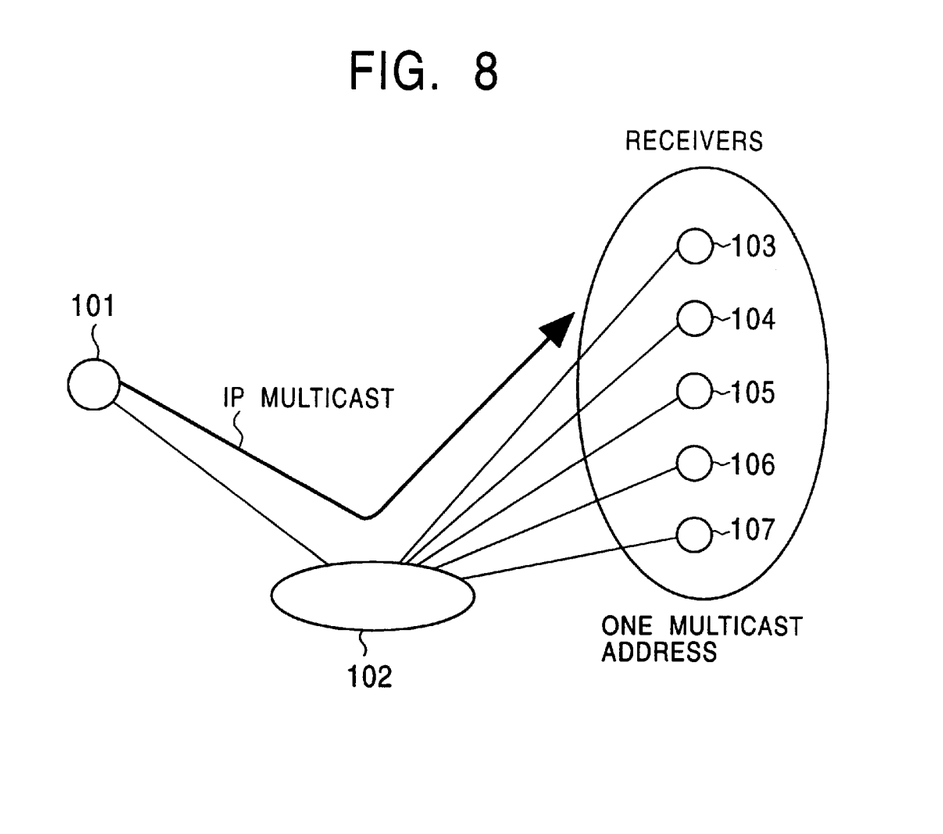
FIG. 8 is a block diagram showing one example of a conventional data distribution system.

FIG. 8 shows the structure of one example of a data distribution system for distributing data by IP multicast, where the system means a logical group of a plurality of apparatuses, and each component apparatus does not need to be in an identical casing.

According to IP multicast, multicast addresses for performing simultaneous multicast (special IP addresses, generally called "class D", having values from 224.0.0.0 to 239.255.255.255) are assigned to a receiver group as the collection of the receivers as the IP addresses of receivers to which data are distributed. A transmitter 101, as a server or the like for multicasting data, designates one particular multicast address before transmitting the data, and receivers 103 to 107, such as computers which receive the multicast data, are designated by the multicast address. In this case, when a router, which performs communication based on a TCP/IP protocol, adapted for multicast on a communication link 102, receives an IP packet having the designated multicast address, it finds channels in which there are the receivers having the designated multicast address, and transmits duplicates of the packet.

Accordingly, the transmitter 101 can distribute data to a plurality of receivers (receivers 103 to 107 in FIG. 8) for receiving the data by simply designating one address (multicast address) without paying attention to the plurality of receivers.

For example, in the communication link 102, such as the Internet, in order to reduce its traffic, data transfer channel control adapted for the IP multicast, such as omitting the transfer of redundant data and transferring data only to necessary addresses, may be performed.

According to the IP multicast, data transfer is performed in accordance with a user datagram protocol (UDP) as one of several connectionless protocols in which communication is performed without recognizing the reception of data at others (the receivers 103 to 107 in FIG. 8). Although the communication based on the UDP can reduce transmitting and receiving loads and can increase the processing speed, the reliability of data deteriorates because, at the level (the protocol level), signal ACK (acknowledgment) (hereinafter referred to as "acknowledgement signal ACK" if necessary) representing that data has been successfully received, and signal NAK (negative acknowledgment) (hereinafter referred to as "retransmission request signal NAK" if necessary) for requesting the retransmission of data when the data has not been successfully received, are not transmitted as responses from the receiving end to the transmitting end.

Accordingly, in order to improve the reliability of data, communication protocols such as a reliable multicast transport protocol (RMTP) have been proposed.

Figure 9A:
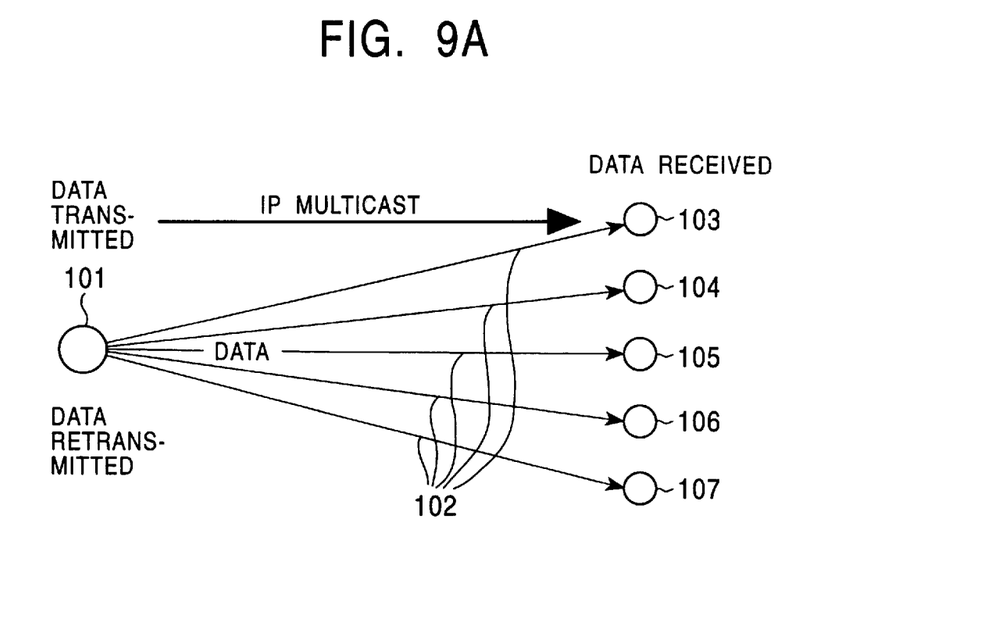
FIGS. 9A and 9B are block diagrams showing one example of a data distribution system using an RMTP.
Figure 9B:
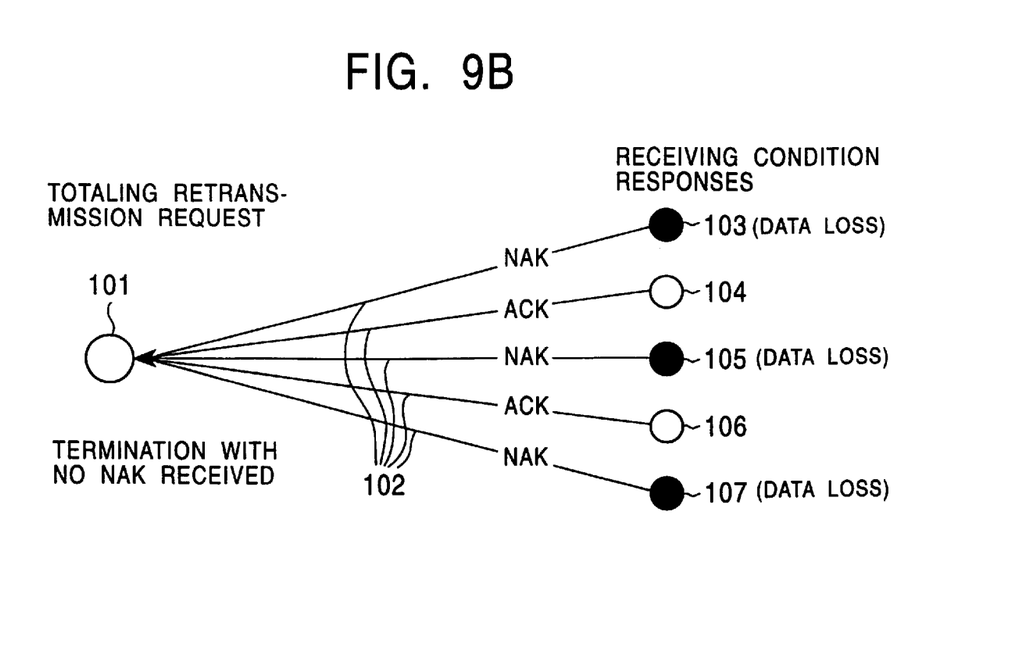

According to communication based on the RMTP, at first, the IP multicast is used to multicast data from the transmitter 101 to the receivers 103 to 107 via the communication link 102, based on the UDP, as shown in FIG. 9A. As shown in FIG. 9B, among the receivers 103 to 107, those which have successfully received the data transmit acknowledgement signals ACK, and the others which have not successfully received the data transmit retransmission request signals NAK to the transmitter 101 via the communication link 102, based on the UDP.

As shown in FIG. 9B, the receivers 104 and 106 have successfully received the data, and accordingly transmit the acknowledgement signals ACK to the transmitter 101, while the receivers 103, 105 and 107 have not successfully received the data, and accordingly transmit the retransmission request signals NAK to the transmitter 101.

When the transmitter 101 receives the retransmission request signals NAK, it transmits (retransmits) the requested data again, based on the UDP, as shown in FIG. 9A, and it repeatedly transmits the data until no retransmission request signals NAK are transmitted, or until a predetermined time while the retransmission request signals NAK are being transmitted.

According to communication based on the RMTP, either the acknowledgement signal ACK or the retransmission request signal NAK is always sent back. Thus, while the efficiency of distributing data to a plurality of users by using the IP multicast is maintained, the reliability of the data can be improved.

When data are distributed using a transmission medium such as terrestrial signals, a satellite link, and a CATV network, the data can simultaneously be multicast in a broad area. At present, protocols based on Internet protocols (IPs) such as the UDP and a transmission control protocol (TCP), which are successfully employed in a computer network, are not supported. Accordingly, when a loss which cannot be restored, or another error is generated while the data are being transmitted, nothing can be done to cope with the error. Therefore, the reliability of the data deteriorates.

In addition, in the case that the IP multicast is performed using, for example, the Internet as a computer network, employing the above-described RMTP can improve the reliability of data. However, in the present Internet, performing the IP multicast causes the repeated transmission of identical data in a wide range, which wastes the limited resources.

Accordingly, techniques for reducing the network traffic include one which implements data transfer channel control adapted for the IP multicast, such as omitting the repeated transferring of data, and transferring data only to necessary receivers, as described above. In this case, a router for performing the control must be provided in the network.

However, when it is assumed that, for example, the worldwide Internet is used as the network, replacing every router in the Internet with such a special router is not practical at present.

Many enterprises connected to the Internet often provide a firewall in order to prevent third parties from intruding into their networks. Packets based on the IP multicast are blocked by the firewall. Thus, the network surrounded by the firewall cannot receive packets based on the IP multicast.

In addition, according to the RMTP, it is required that either acknowledgement signal ACK or retransmission request signal NAK should always be sent as a response in order to strengthen the reliability of data, as described in FIG. 9B.

Accordingly, a network that enables bidirectional communication is needed for combining a transmitter and receivers. In order to accept data distribution service based on the RMTP, the receivers must transmit acknowledgement signals ACK and retransmission request signals NAK to the transmitter.

In addition, for example, in the case that data are distributed to a large number of nationwide or worldwide users, causing every user (user's receiver) to always transmit either acknowledgement signal ACK or retransmission request signal NAK congests the network. Consequently, it is difficult to efficiently distribute the data.

SUMMARY OF THE INVENTION

Accordingly, it is an object of the present invention to provide a transmitter and transmitting method, a receiver and receiving method, and a transceiver and transmitting/receiving method which enable the efficient and highly reliable distribution of data to a large number of users.

To this end, according to an aspect of the present invention, the foregoing object has been achieved through provision of a transmitter for transmitting data to one or more receivers via a multicast network capable of multicast, the transmitter comprising: transmitting means for transmitting the data via the multicast network; receiving means for receiving only retransmission requests for requesting the retransmission of the data, the retransmission requests being transmitted from the receivers; totaling means for totaling the retransmission requests received by the receiving means; and control means for controlling the transmitting means to retransmit the data, the retransmission of which is requested, based on the total from the totaling means.

According to another aspect of the present invention, the foregoing object has been achieved through provision of a transmitting method for transmitting data to one or more receivers via a multicast network capable of multicast, the transmitting method comprising the steps of: transmitting the data via the multicast network; receiving only retransmission requests for requesting the retransmission of the data when the retransmission requests are transmitted from the receivers; totaling the retransmission requests; and retransmitting the data, the retransmission of which is requested, via the multicast network, based on the total.

According to a further aspect of the present invention, the foregoing object has been achieved through provision of a receiver for receiving data transmitted via a multicast network capable of multicast, the receiver including: receiving means for receiving the data transmitted via the multicast network; verifying means for verifying whether or not the data have been successfully received; and transmitting means in which, only when the data have not been successfully received, the transmitting means transmits to a transmitter having transmitted the data a retransmission request for requesting the retransmission of the data not successfully received.

According to a still further aspect of the present invention, the foregoing object has been achieved through provision of a receiving method for receiving data transmitted via a multicast network capable of multicast, the receiving method comprising the steps of: receiving the data transmitted via the multicast network; verifying whether or not the data have been successfully received; and transmitting to a transmitter having transmitted the data a retransmission request only when the data have not been successfully received, the retransmission request requesting the retransmission of the data not successfully received.

According to yet another aspect of the present invention, the foregoing object has been achieved through provision of a transceiver comprising a transmitter for transmitting data via a multicast network capable of multicast, and one or more receivers for receiving the data, in which the transmitter comprises: data transmitting means for transmitting the data via the multicast network; retransmission-request receiving means for receiving only retransmission requests for requesting the retransmission of the data, the retransmission requests being transmitted from the receivers; totaling means for totaling the retransmission requests received by the retransmission-request receiving means; and control means for controlling the data transmitting means to retransmit the data, the retransmission of which is requested, based on the total from the totaling means, and at least one of the one or more receivers comprises: data receiving means for receiving the data transmitted via the multicast network; verifying means for verifying whether or not the data have been successfully received; and retransmission-request transmitting means for transmitting the retransmission requests to the transmitter only when the data have not been successfully received.

According to yet further aspect of the present invention, the foregoing object has been achieved through provision of a transmitting/receiving method for a transceiver composed of a transmitter for transmitting data via a multicast network capable of multicast, and one or more receivers for receiving the data, in which the transmitting/receiving method causes the transmitter to perform the steps of: transmitting the data via the multicast network; receiving only retransmission requests when the retransmission requests for requesting the retransmission of the data are transmitted from the receivers; totaling the retransmission requests; and retransmitting the data, the retransmission of which is requested, based on the total, and the transmitting/receiving method causes at least the one or more receivers to perform the steps of: receiving the data transmitted via the multicast network; verifying whether or not the data have been successfully received; and transmitting the retransmission requests only when the data have not been successfully received.

According to a transmitter and transmitting method of the present invention, when data are transmitted via a multicast network, and retransmission requests for requesting the retransmission of the data are transmitted from receivers, only the retransmission requests are received. The retransmission requests are totaled, and based on the total, data, the retransmission of which is requested, are retransmitted. Therefore, data can efficiently be distributed with high reliability.

According to a receiver and receiving method of the present invention, data transmitted via a multicast network are received, and verification of whether the data have been successfully received is performed. In addition, only when the data have not been successfully received, a retransmission request for requesting the retransmission of the data is transmitted to a transmitter having transmitted the data. Accordingly, data can efficiently be distributed with high reliability.

According to a transceiver and transmitting/receiving of the present invention, a transmitter transmits data via a multicast network, and receives only retransmission requests for requesting the retransmission of the data only when the retransmission requests are transmitted from receivers. The retransmission requests are totaled, and based on the total, the data, the retransmission of which is requested, is retransmitted. In addition, the data transmitted via the multicast network are received by at least one or more of one or more receivers, and verification of whether the data have been successfully received is performed. Only when the data have not been successfully received, a retransmission request is transmitted to the transmitter. Accordingly, data can efficiently be distributed with high reliability.

DESCRIPTION OF THE PREFERRED EMBODIMENT

Figure 1:
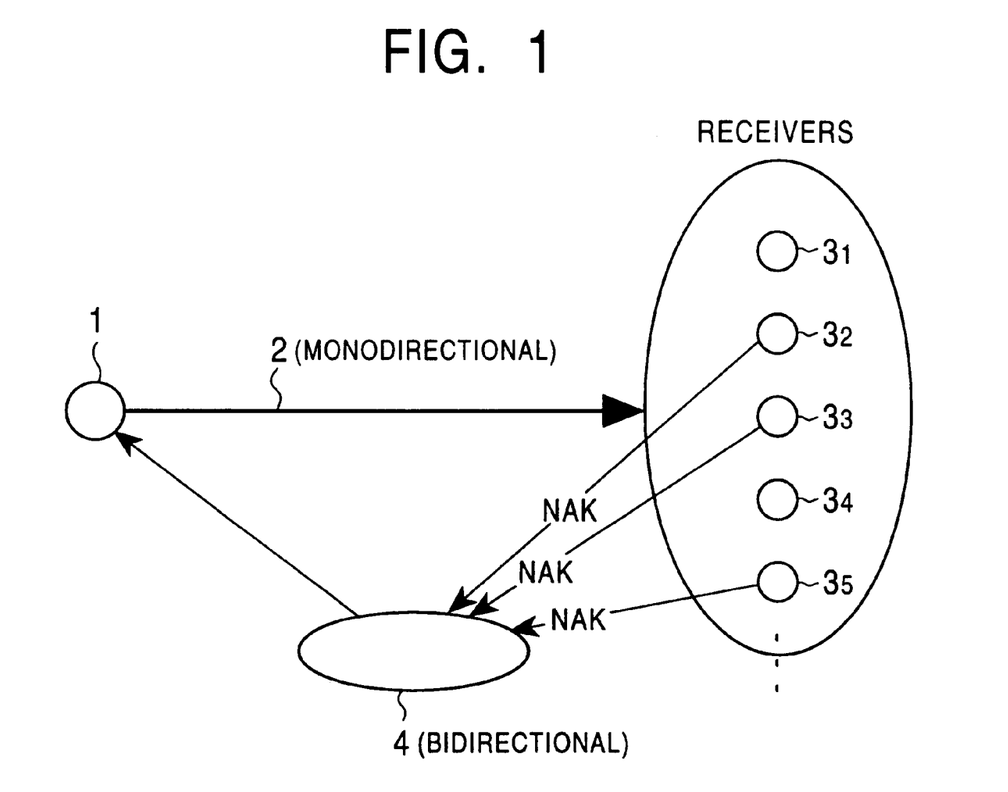
FIG. 1 is a block diagram showing one embodiment of a data distribution system to which the present invention is applied.

FIG. 1 shows an example of one embodiment of a data distribution system to which the present invention is applied.

In this data distribution system, data are transmitted by a transmitter 1, and the data are received by receivers $3_1$, $3_2$, $3_3$, etc. The transmission of data by the transmitter 1 is performed via a network 2 (called a "broadcasting link" in order to be distinguished from a communication link 4 described below) which can perform at least simultaneous multicast to a large number of users, such as a satellite link, a CATV network, terrestrial signals, or the like. In this embodiment, among the receivers $3_1$, $3_2$, $3_3$, etc., the receivers $3_2$, $3_3$ and $3_5$ transmit retransmission request signals NAK to the transmitter 1 via a network 4 (called a "communication link" in order to be distinguished from the broadcasting link 2) which can transmit information to the transmitter 1, such as an analog public network, an integrated system digital network (ISDN), the Internet, or the like.

The operation of the data distribution system will be described with reference to FIGS. 2A and 2B.

Figure 2A:
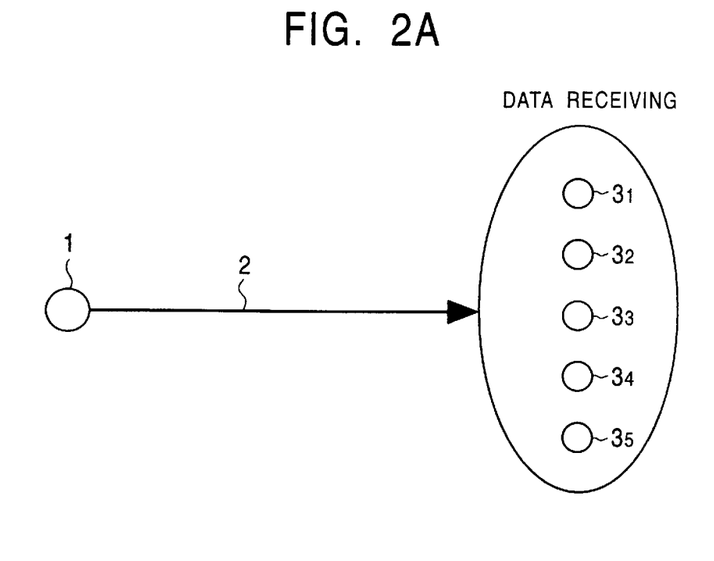
FIGS. 2A and 2B are charts illustrating the operation of the data distribution system in FIG. 1.

The transmitter 1 transmits data via the broadcasting link 4, based on, for example, IP multicast, as shown in FIG. 2A.

The data transmitted (distributed) via the broadcasting link 2 are received by the public or the receivers $3_1$, $3_2$, $3_3$, etc., which are owned by the users having predetermined contracts. The receivers $3_1$, $3_2$, $3_3$, etc. may be scattered (in networks having different domains) to form a network or may be placed in one network.

For a brief description, only the receivers $3_1$ to $3_5$ as the user's receivers will be discussed below. In addition, the receivers $3_1$ to $3_5$ are collectively called "receivers 3" if necessary.

The receivers $3_1$ to $3_5$ recognize whether they have successfully received the data transmitted via the broadcasting link 2, and store the successfully received data.

The data stored in the receivers $3_1$ to $3_5$ are, for example, displayed or output as sound according to a predetermined operation performed by the user.

As described above, in this embodiment, the receivers $3_2$, $3_3$ and $3_5$, among the receivers $3_1$ to $3_5$, have the function of transmitting information to the transmitter 1 via the communication link 4 (accordingly, the other receivers $3_1$ and $3_4$ do not have the above function). Only when data are not successfully received, retransmission request signal NAK is transmitted via the communication link 4 by the receiver $3_2$, $3_3$ or $3_5$.

Figure 2B:
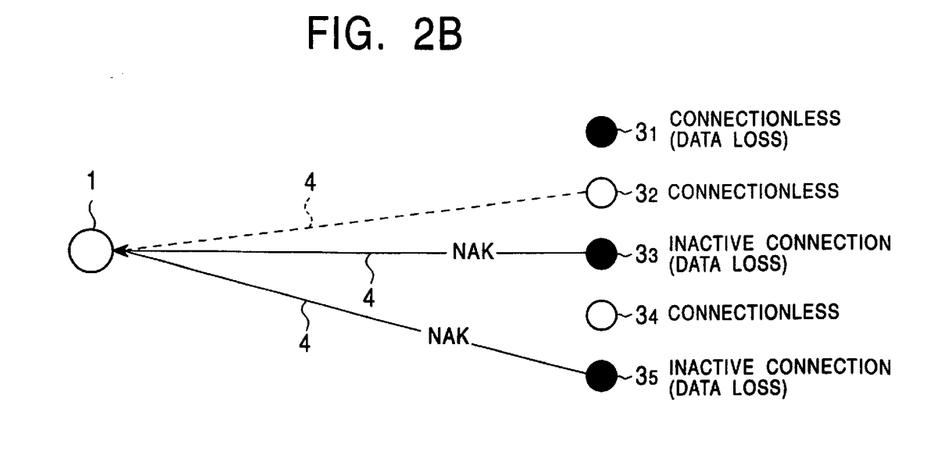

In other words, as shown in FIG. 2B, the data cannot successfully be received by the receivers $3_1$, $3_3$ and $3_5$ (indicated by the black circles in FIG. 2B) among the receivers $3_1$ to $3_5$, and retransmission request signals NAK are transmitted via the communication link 4 by the receivers $3_3$ and $3_5$, which have the function of transmitting retransmission request signals NAK.

When the transmitter 1 receives the retransmission request signals NAK via the communication link 4, for example, after a predetermined time passes since transmitting data via the broadcasting link 4, it transmits data again, the retransmission of which is requested by the retransmission request signals NAK, as shown in FIG. 2A.

As described above, since the receivers $3_1$ and $3_4$ do not have the function of transmitting information to the transmitter 1, the receivers $3_1$ and $3_4$ simply receive the transmitted data, and when the data are transmitted, a connection is not established (cannot be established) between the transmitter 1 and the receiver $3_1$ or $3_4$, as in the case when handshake-based communication is performed. Accordingly, it can be seen that the transmission of the data from the transmitter 1 to the receiver $3_1$ or $3_4$ is performed by connectionless communication, similarly to the case in which the above-described UDP is used to transmit data.

Although the receiver $3_2$ has the function of transmitting information to the transmitter 1, the receiver $3_2$ in FIG. 2B has successfully received the data, and accordingly does not transmit retransmission request signal NAK. Therefore, its connection with the transmitter 1 is not established, similarly to the cases of the receivers $3_1$ and $3_4$. Thus, it can be seen that the transmission of the data from the transmitter 1 to the receiver $3_2$ is also performed by connectionless communication.

In addition, the other receivers $3_3$ and $3_5$ in FIG. 2B, which have the function of transmitting information to the transmitter 1, have not successfully received the data, and accordingly transmit retransmission request signals NAK to the transmitter 1 via the communication link 4. In other words, when the data is received, the retransmission request signal NAK as a response to the reception is sent to the transmitter 1. Accordingly, connection is established as in the case where handshake-based communication is performed. A response to the transmitter 1 is not transmitted in either of the following cases: when the data can successfully be received, or when the data cannot successfully be received but the response is transmitted in the form of retransmission request signal NAK only when the data cannot be received. In other words, the connection with the transmitter 1 is not always established but is established only when the data cannot successfully be received. In this meaning, it can be seen that the transmission of the data from the transmitter 1 to the receiver $3_3$ or $3_5$ is performed by inactive connection communication (communication in which connection is not established when data are successfully received, and connection is established when data cannot successfully be received).

In the above manner, the retransmitted data are received by the receiver $3_2$, $3_3$ or $3_5$, which has transmitted retransmission request signal NAK, and the receiver $3_1$ or $3_3$, not having the function of retransmission request signal NAK, and which has not successfully received the data. This is followed by a determination of whether the data have been successfully received. After that, similar processing is repeatedly performed.

In addition, after the transmitter 1 retransmits the data, it repeatedly retransmits the data when retransmission request signals NAK are transmitted again. When no retransmission request signals NAK are transmitted, the transmitter 1 transmits the next data. After that, similar processing is repeatedly performed.

As described above, only the retransmission request signals NAK are transmitted from the receivers 3 to the transmitter 1 via the communication link 4. Accordingly, compared with the case that acknowledgement signals ACK are also transmitted, if the number of receivers increases nationwide, the traffic congestion of the communication link 4 can be reduced, which consequently enables effective data distribution.

According to the data distribution system in FIG. 1, all the receivers (receivers $3_1$ to $3_5$ in this embodiment), for receiving data transmitted from the transmitter 1 via the broadcasting link 2, do not need to have the function of transmitting retransmission request signal NAK. Accordingly, even a receiver not having the above function can receive data from the transmitter 1.

In the case that the receivers $3_1$ to $3_5$ in FIG. 1 do not have the function of transmitting retransmission request signal NAK, data are not retransmitted regardless of whether the receivers $3_1$ to $3_5$ have successfully received data, as in the case where data distribution by IP multicast is simply performed. Thus, in this case, the reliability of the data deteriorates. Accordingly, it is preferable that one or more of the receivers $3_1$ to $3_5$ have the function of retransmitting retransmission request signal NAK.

It is also preferable that the number of receivers having the function of transmitting retransmission request signal NAK is larger. In other words, receivers (hereinafter referred to as "non-retransmission-request receivers"), not having the function of transmitting retransmission request signal NAK, cannot transmit retransmission request signals NAK when failing to successfully receive data. However, if there is a retransmission-request receiver having failed to successfully receive identical data, the retransmission-request receiver transmits retransmission request signal NAK, which causes the transmitter 1 to retransmit the data via the broadcasting link 2. Consequently, the data is also retransmitted to the non-retransmission-request receivers having failed to successfully receive the data, which can improve the reliability of not only the data received by the retransmission-request receiver but also the data received by the non-retransmission-request receivers.

In addition, it is expected that enabling only the retransmission request signal NAK to be transmitted generates an error while it is being transmitted, which may hinder the transmitter 1 from receiving the retransmission request signal NAK. However, the case where the receiver 1 cannot receive retransmission request signal NAK transmitted by one receiver is equivalent to the case where the receiver is not a retransmission-request receiver but a non-retransmission-request receiver. Accordingly, in order to cope with such a case, the number of retransmission-request receivers is preferably larger.

When the receivers include no retransmission-request receiver, it is difficult to maintain the reliability of data, but the data can be distributed.

The broadcasting link 2 and the communication link 4 do not need to be physically separate networks. For example, when the broadcasting link 2 is formed by using a CATV network, the CATV network can be used as the communication link 4. In addition, for example, when data distribution via the broadcasting network 4 is performed by IP multicast using the Internet etc., the communication link 4 can be formed by using the Internet.

It is preferable that the broadcasting link 2 is one which enables simultaneous multicast in a broad area, namely, one adapted for broadcasting, such as a satellite link, terrestrial signals, or a CATV network. This is based on the following reason. With the above-described broadcasting link 2, the direct connections between the transmitter 1 and the large number of receivers are established to form a network, so that each receiver is equivalent when observed from the transmitter 1. Accordingly, for example, the above-described problems of channel control, generated when IP multicast is performed using the present Internet, and a problem of wasting network resources, and so forth, can be avoided. When a wireless link such as a satellite link or terrestrial signals is used as the broadcasting link 2, data can be distributed to a computer or the like (as a receiver) connected to a network provided with a firewall within range covered by the radio waves.

Next, the operation of the data distribution system in FIG. 1 will be further described with reference to FIG. 3.

The transmitter 1 transmits data in accordance with a predetermined schedule. Before transmitting the data, it transmits information needed for the receiving end to restore the data, for example, information for recognizing the data, the contents of the data, the amount of data, time at which the data is transmitted, a transmission rate, a protocol, the number of transmissions (the data are repeatedly transmitted as described below, and the number of transmissions means the number of the repetitions), and so forth, by using IP multicast via the broadcasting link 2.

These transmission conditions are received by the receivers 3 while the receivers 3 stand by before the data are transmitted. After that, the receivers 3 receive and restore the data, based on the transmission conditions.

In addition, in accordance with the schedule information, the transmitter 1 processes data to be transmitted to form one or more packets, and generates IP packets by adding to each packet, information needed for restoring the original data. In FIG. 3, the data are processed to form five packets: packets a, b, c, d and e.

After that, the transmitter 1 uses IP multicast, for example, to successively transmit packets a to e via the broadcasting link 2.

The receivers 3 receive the successively transmitted packets a to e. The receivers 3 transform packets a to e to the original data, based on the information given to them. The receivers 3 confirm whether they have successfully received packets a to e.

Figure 3:
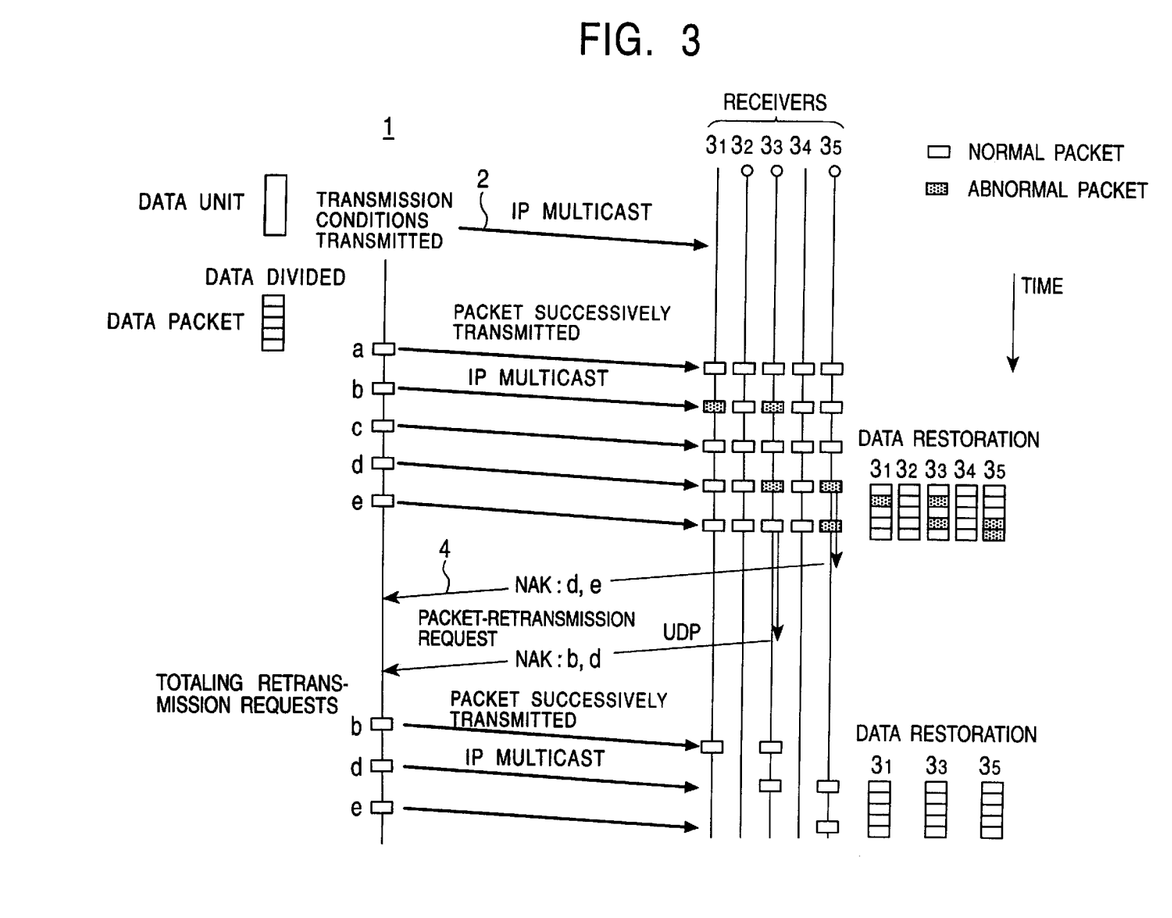
FIG. 3 is a chart illustrating the operation of the data distribution system in FIG. 1.

In FIG. 3, the receivers $3_2$ and $3_4$ have successfully received packets a to e. Conversely, the receiver $3_1$, the receiver $3_3$, and the receiver 5 have failed to successfully receive packet b, packets b and d, and packets d and e, respectively. They lack the packets to restore the original data (In FIG. 3 the packets not successfully received are indicated in black).

Among the receivers $3_1$, $3_3$ or $3_5$ not having successfully received any of packets a to e needed for restoring the data, when the receivers $3_3$ and $3_5$, as retransmission-request receivers, receive the final packet e, and a predetermined time passes, they use the UDP to transmit to the transmitter 1 via the communication link 4 a retransmission request signal NAK for requesting in units of data the retransmission of the packets not successfully received. In other words, in FIG. 3, the receiver $3_3$ and the receiver $3_5$ transmit retransmission request signals NAK for respectively requesting the retransmission of packets b and d and the retransmission of packets d and e.

After finishing the transmission of packets a to e, there is a predetermined waiting time, and the transmitter 1 receives and totals retransmission request signals NAK transmitted during the time. The transmitter 1 finds, for example, the logical sum of the packets, the retransmission of which is requested, whereby it can recognize packets to be transmitted. In FIG. 3, the retransmission of packets b and d, and the retransmission of packets d and e, are requested by the receiver $3_3$ and the receiver $3_5$, respectively. Thus, their logical sum: packets b, d and e are recognized as packets to be retransmitted.

The transmitter 1 successively transmits (retransmits) the recognized packets b, d and e via the broadcasting link 2, similarly to the above-described case.

The receivers $3_2$ and $3_4$, which successfully received all packets a to e, ignore (delete) the retransmitted packets b, d and e from the transmitter 1. The receiver $3_3$, which requested the retransmission of packets b and d, receives only packets b and d, ignoring packet e. Similarly, the receiver $3_5$, which requested the retransmission of packets d and e, receives only packets d and e, ignoring packet b.

In addition, the receiver $3_1$ as a non-retransmission-request receiver, which has not successfully received packet b, requests retransmission, and receives only packet b transmitted from the transmitter 1, ignoring packets d and e.

The receivers, which have received the packets retransmitted in the above manner, use the packets to restore the original data.

Accordingly, when a retransmission-request receiver cannot successfully receive a packet, it can obtain the packet by retransmitting request signal NAK for the packet. Even when being unable to successfully receive a packet, a non-retransmission-request receiver can obtain the packet by making use of another receiver as a retransmission-request receiver if it has transmitted retransmission request signal NAK for the packet.

In addition, in FIG. 3, when each packet from the transmitter 1 cannot successfully be received, each retransmission request signal NAK is not transmitted immediately, but all packets for certain data are received, and retransmission request signals NAK for requesting packets not successfully received are simultaneously transmitted. When the retransmission request signals NAK are transmitted in units of data in this manner, the traffic of the communication link 4 can be reduced, compared with the case where retransmission request signals NAK are transmitted in units of packets.

Whenever receiving retransmission request signal NAK, the transmitter 1 does not retransmit the packet requested by the retransmission request signal NAK, but totals retransmission request signals NAK received in a predetermined period, and retransmits packets in accordance with the total. Accordingly, efficient retransmission can be performed compared with the case where packet retransmission is performed in accordance with each retransmission request signal NAK.

After a packet is retransmitted, when any one of the retransmission-request receivers, which requested the retransmission of the packet, fails to successfully receive the packet again, the retransmission-request receiver transmits retransmission request signal NAK again. In addition, the transmitter 1 repeatedly retransmits the packet when receiving the retransmission request signal NAK. When the transmitter 1 is unable to receive a retransmission request signal NAK, in other words, no retransmission request signal NAK is transmitted from the receiver, the transmitter 1 transmits packets constituting the next data.

When packet retransmission is repeatedly performed until no retransmission request signal NAK is transmitted from even one retransmission-request receiver, there may an extreme case where the packet retransmission is repeatedly performed a number of times for only the one retransmission-request receiver, which is not efficient. Accordingly, the number and duration of packet retransmissions may be limited.

Figure 4:
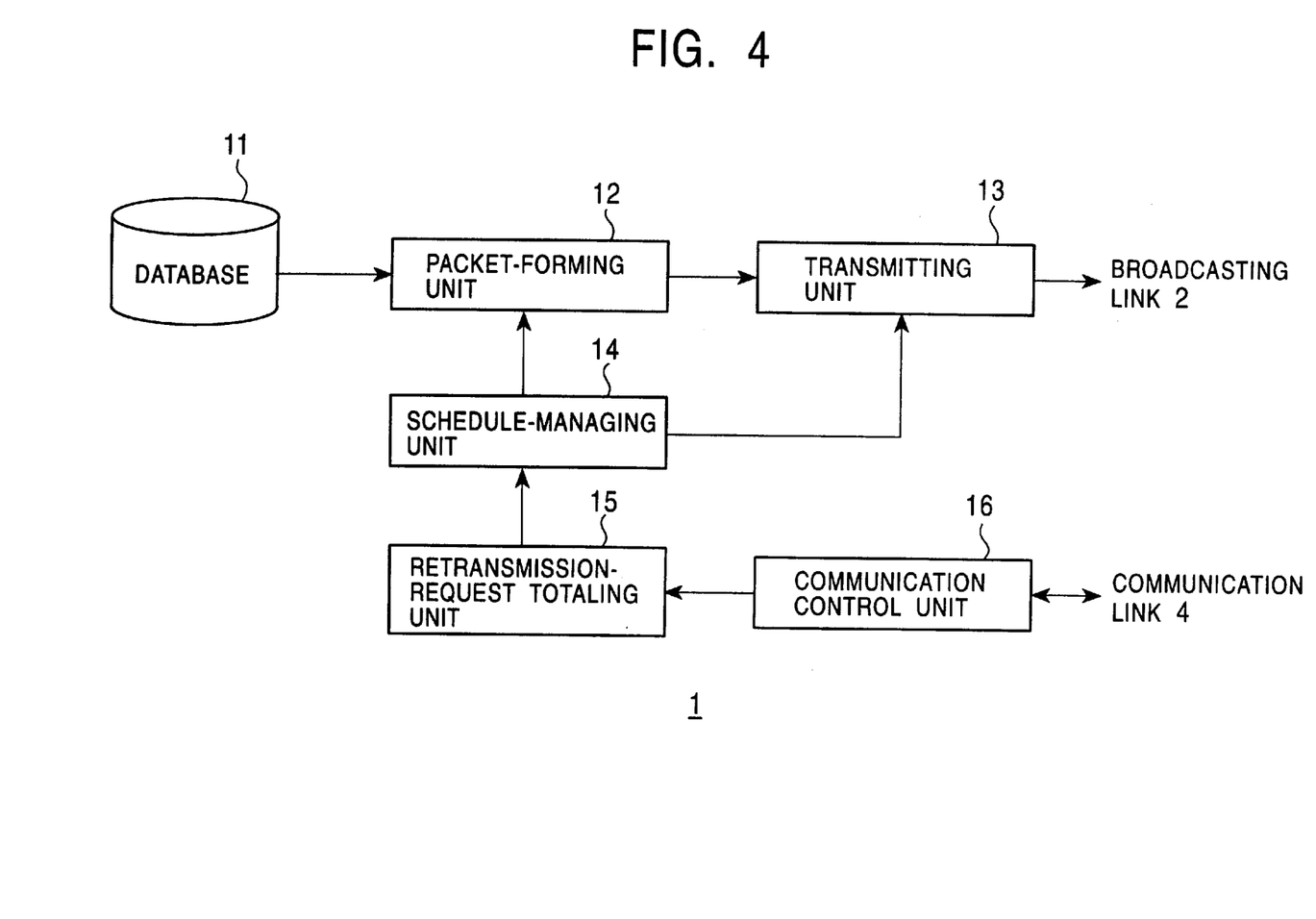
FIG. 4 is a block diagram showing transmitter 1 in FIG. 1.

Next, FIG. 4 shows an example of a block diagram of the transmitter 1 shown in FIG. 1.

Data to be distributed are stored in a database 11. Under control of a schedule-managing unit 14, a packet-forming unit 12 reads the data from the database 11. It processes the data to form one or more IP packets, and supplies them to a transmitting unit 13. Under control of the schedule-managing unit 14, the transmitting unit 13 uses IP multicast or the like to transmit the packets from the packet-forming unit 12 via the broadcasting link 2. In accordance with a predetermined schedule, the schedule-managing unit 14 controls the packet-forming unit 12 and the transmitting unit 13 to form and transmit the packets. The schedule-managing unit 14 also controls the transmitting unit 13 to retransmit necessary packets, in accordance with the total of retransmission request signals NAK by a retransmission-request totaling unit 15. The retransmission-request totaling unit 15 totals retransmission request signals NAK received by a communication control unit 16, and supplies the total to the schedule-managing unit 14. The communication control unit 16 controls communication with receivers (receivers $3_2$, $3_3$ and $3_5$ in the embodiment in FIG. 1) via the communication link 4, so that a retransmission request signal NAK transmitted based on a UDP or the like is received via the communication link 4, and is supplied to the retransmission-request totaling unit 15.

Figure 5:
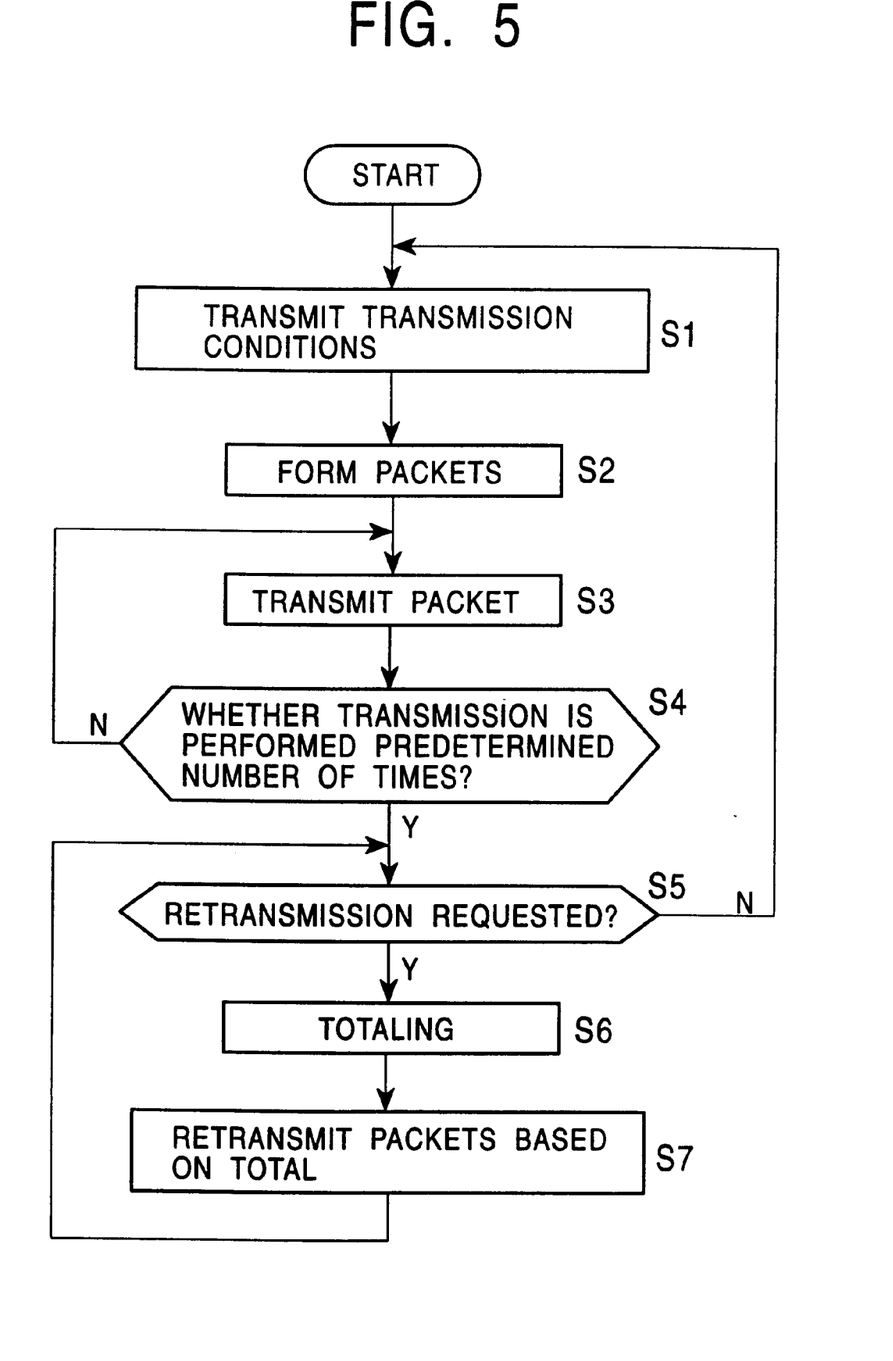
FIG. 5 is a flowchart illustrating the operation of the transmitter 1 in FIG. 4.

Next, with reference to the flowchart in FIG. 5, its process will be described.

At first, in step S1, the schedule-managing unit 14 controls the transmitting unit 13 to transmit transmission conditions concerning data to be transmitted in accordance with the predetermined schedule, via the broadcasting link 2. The schedule-managing unit 14 controls the packet-forming unit 12 in accordance with the schedule to read data to be transmitted, from the database 11, and form IP packets. The IP packets are successively supplied to the transmitting unit 13, and are transmitted via the broadcasting link 2 in step S3.

The process proceeds to step S4, in which the schedule-managing unit 14 determines whether the packets constituting the data are repeatedly transmitted a predetermined number of times. If it has determined that the transmission was not repeatedly performed the predetermined number of times, the process returns to step S3, in which the packets are repeatedly transmitted.

There are the receivers $3_1$ and $3_4$ as non-retransmission-request receivers among the receivers 3 for receiving data transmitted via the broadcasting link 2. If all the receivers $3_2$, $3_3$ and $3_5$, as retransmission-request receivers, have successfully received data, retransmission is not requested. Accordingly, in this case, if the receiver $3_1$ or $3_4$ has failed to successfully receive data, it cannot obtain the data because it cannot request retransmission. Even if the receiver $3_2$, $3_3$ or $3_5$ has failed to successfully receive the data, and it has transmitted retransmission request signal NAK, the transmitter 1 may not successfully receive the retransmission request signal NAK. Also, in this case, data retransmission is not performed.

Accordingly, the transmitter 1 is designed to transmit packets constituting data a predetermined number of times, which increases the possibility that the receivers 3 can successfully receive the data.

The packet transmission may not be repeatedly performed but may be repeatedly performed until a predetermined time elapses.

In step S4, if it is determined that the packets constituting the data have been repeatedly transmitted the predetermined number of times, the process proceeds to step S5, and determines whether the communication control unit 16 had received retransmission request signal NAK. In step S5, if it is determined that the retransmission request signal NAK has not been received, the process returns to step S1, in which transmission conditions are transmitted concerning the next data to be transmitted. After that, similar processing is repeatedly performed.

In addition, in step S5, if it is determined that the retransmission request signal NAK has been received, the process proceeds to step S6, in which retransmission request signals NAK are totaled. In other words, retransmission request signals NAK received by the communication control unit 16 are supplied to the retransmission-request totaling unit 15. The retransmission-request totaling unit 15 finds as packets to be retransmitted, the logical sum of packets the retransmission of which is requested by the retransmission request signal NAK from the communication control unit 16. For example, in the above-described example shown in FIG. 3, the retransmission of packets b and d is requested by the receiver $3_3$, and the retransmission of packets d and e is requested by the receiver $3_5$. Accordingly, the logical sum of the packets, namely, packets b, d and e are found as packets to be retransmitted. Information (the result of totaling the retransmission request signals NAK)(hereinafter referred to as "retransmission information" if necessary) representing the packets to be retransmitted is supplied from the retransmission-request totaling unit 15 to the schedule-managing unit 14.

When the schedule-managing unit 14 receives the retransmission information from the retransmission-request totaling unit 15, it controls the transmitting unit 13 to retransmit packets corresponding to the retransmission information in step S7, and the process returns to step S5. As a result of the retransmission, when retransmission request signals NAK are transmitted, the processing from steps S5 to S7 is repeatedly performed, and when no retransmission request signals NAK are transmitted, the process returns from step S5 to step S1. As described above, it is possible that the packet-retransmission processing from steps S5 to S7 ends after it is performed predetermined times or predetermined duration before the process returns to step S1.

Figure 6:
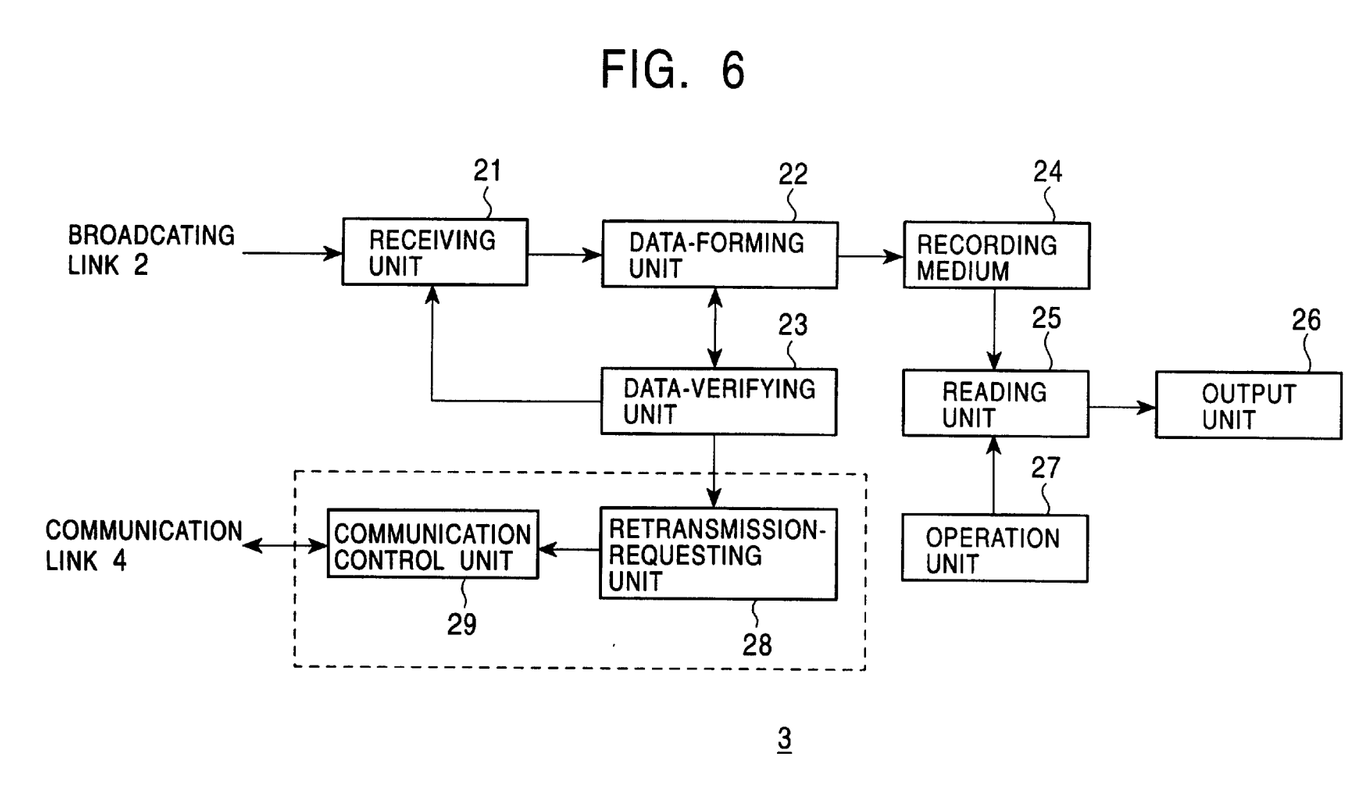
FIG. 6 is a block diagram showing receivers 3 in FIG. 1.

Next, FIG. 6 shows a block diagram of each receiver 3 shown in FIG. 1.

A receiving unit 21 receives information (such as packets and transmission conditions) transmitted from the broadcasting link 2, and supplies them to a data-forming unit 22. The data-forming unit 22 processes packets supplied from the data receiving unit 21 to restore the original data in accordance with transmission conditions supplied from the data receiving unit 21. A data-verifying unit 23 monitors the packets supplied to the data-forming unit 22, and verifies whether or not the packets have been successfully received. The data-verifying unit 23 also controls the receiving unit 21 to delete packets repeatedly received. A recording medium 24 consists of, for example, a hard disc, a magneto-optical disc or the like, and is used so that the data restored by the data-forming unit 22 are stored (recorded) in it. Operating an operation unit 27 causes a reading unit 25 to read the data from the recording medium 24 before supplying them to an output unit 26. The output unit 26 includes a display and a speaker, and displays and prints the data from the reading unit 25, or outputs them as sound. The operation unit 27 is operated for reading the data recorded in the recording medium 24.

When the data-verifying unit 23 verifies that the packets have not been successfully received, a retransmission-requesting unit 28 requests the retransmission of them. In other words, the retransmission-requesting unit 28 causes the transmitter 1 to perform transmission by generating retransmission request signal NAK for requesting the retransmission of the packets not successfully received, and controlling the communication control unit 29. The retransmission-requesting unit 28 generates retransmission request signal NAK in units of data, as described. In other words, after the receiving unit 21 finishes receiving a series of packets constituting certain data, retransmission request signal NAK is generated in connection with packets not successfully received, among the packets constituting the data.

The communication control unit 29 controls its communication with transmitter 1 via the communication link 4, so that it uses the UDP etc. to transmit the retransmission request signal NAK supplied from the retransmission-requesting unit 28 to the transmitter 1 via the communication link 4.

Among the receivers 3, the receivers $3_2$, $3_3$ and $3_5$ as retransmission-request receivers are as described above. However, the receivers $3_1$ and $3_4$ as non-retransmission-request receivers have a structure in which the retransmission-requesting unit 28 and the communication control unit 29, surrounded by a dotted line in FIG. 6, are not provided, or a condition in which the function of either unit or the functions of both units pause.

Figure 7:
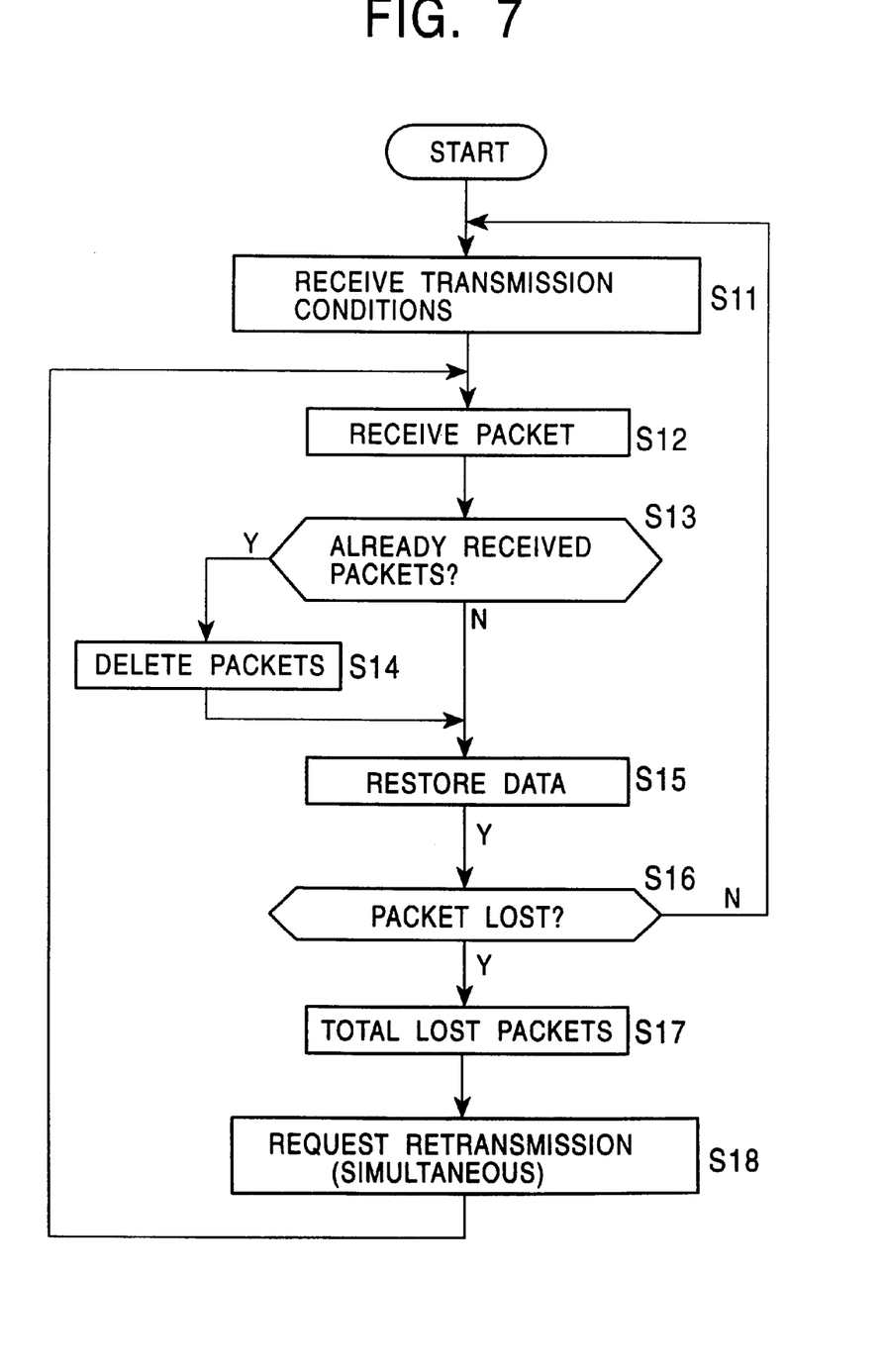
FIG. 7 is a flowchart illustrating the operation of the receivers 3 in FIG. 6.

Next, with reference to the flowchart in FIG. 7, its process will be described.

In step S11, in the receivers 3, packets transmitted from the transmitter 1 via the broadcasting link 2 are received by the receiving unit 21. The receiving unit 21 supplies the received transmission conditions to the data-verifying unit 23 via the data-forming unit 22. After that, until being supplied with the next transmission conditions, the data-verifying unit 23 controls the receiving unit 21 and the data-forming unit 22, based on the transmission conditions supplied via the data-forming unit 22.

When the transmission conditions are received, the process proceeds to step S12, in which a series of packets constituting data, transmitted from the transmitter 1 via the broadcasting link 2, are received by the receiving unit 21. When the packets are received by the receiving unit 21, the process proceeds to step S13, in which the receiving unit 21 determines whether or not the receiving packets include those identical to packets already received by the receiving unit 21 (which are hereinafter referred to as "already received packets"). In other words, since the transmitter 1 repeatedly transmits packets a number of times, the receiving unit 21 may again receive packets identical to the already received packets. In this case, the data-verifying unit 23 controls the receiving unit 21 to ignore the received packets. Accordingly, duplicate packets are deleted by the receiving unit 21.

In step S13, if the receiving unit 21 has determined that its received packets include those identical to the already received packets, the process proceeds to step S14, in which the data-verifying unit 23 controls the receiving unit 21 to delete those identical to the already received packets, and the process proceeds to step S15. Accordingly, among the packets received by the receiving unit 21, those identical to the already received packets are deleted. The other packets not deleted by the receiving unit 21 are supplied to the data-forming unit 22.

In step S13, if the receiving unit 21 has determined that its received packets include nothing identical to the already received packets, all the packets received by the receiving unit 21 are supplied to the data-forming unit 22.

In step S15, the data-forming unit 22 restores the original data by using the packets supplied from the receiving unit 21.

In step S16, the data-verifying unit 23 determines whether or not all the packets supplied to the data-forming unit 22 are already received. If the data-verifying unit 23 has determined that all the packets are successfully received, the data-forming unit 22 supplies and stores the restored data to the recording medium 24. The process returns to step S11 after the next transmission conditions are transmitted from the transmitter 1 via the broadcasting link 2.

The data recorded on the recording medium 24 in the above manner are read by the reading unit 25 in accordance with the operation of the operation unit 27, and is supplied to the output unit 26 so that it is displayed. This enables the user to use the data recorded on the recording medium 24.

In step S16, if the data-verifying unit 23 has determined that even one of the packets supplied to the data-forming unit 22 is not successfully received, the process proceeds to step S17, in which the data-verifying unit 23 totals packets (lost packets) not successfully received. In other words, the data-verifying unit 23 detects all of those not successfully received among necessary packets for restoring certain data, and supplies them to the retransmission-requesting unit 28.

The process proceeds to step S18, in which all the packets not successfully received are simultaneously requested. In other words, in step S18, retransmission request signal NAK for requesting the simultaneous retransmission of the packets not successfully received is generated and supplied to the communication control unit 29. In step S18, the communication control unit 29 transmits to the transmitted 1, the retransmission request signal NAK from the retransmission-requesting unit 28.

After that, the process returns to step S12, in which packets, requested by the retransmission request signal NAK, retransmitted via the broadcasting link 2, are received by the receiving unit 21. At this time, when the receiving unit 21 can receive all the packets requested by the retransmission request signal NAK, the packets and the successfully already received packets are used to restore the original data in step S15.

The receivers $3_1$ and $3_4$, not having the retransmission-requesting unit 28 and the communication control unit 29, skip the processing of steps S17 and S18. Accordingly, in step S16, if the data-verifying unit 23 has determined that even one of the packets supplied to the data-forming unit 22 is not successfully received, the receivers $3_1$ and $3_4$ perform the processing of step S12 after packets not successfully received are retransmitted by the retransmission request signal NAK from the receivers $3_2$, $3_3$ and $3_5$. If the packets not successfully received are not retransmitted, data that are completed by including the packets are, for example, not recorded on the recording medium 24 but are deleted.

The case in which the present invention is applied to a data distribution system has been described. This data distribution system can be applied to the multimedia contents distribution business by means of digital broadcasting using satellite communication and the Internet as the broadcasting link 2 and the communication link 4, as introduced in, for example, "Nikkei Multimedia", March, 1997.

With the spread of information apparatuses with a built-in computer into ordinary homes, tests are actively done in which a transmission medium (hereinafter referred to as a "broadcasting medium" if necessary) capable of simultaneous multicast in a broad area, such as a satellite link, terrestrial signals or a CATV network used for television broadcasting and radio broadcasting, is used not only to distribute images and sound but also to distribute various types of digital data handled by computers and so forth. It is expected that this trend of using the broadcasting medium to distribute data to the computers will increasingly flourish in the future.

In addition, with the spread of terminals capable of connecting to the Internet as a computer network, and the increased capacity of lines for the connection, tests are also done in which the Internet is used to simultaneously multicast data such as images (particularly moving pictures) and sound, similarly to television broadcasting and radio broadcasting. It is also expected that the trend of using the computer network for so-called broadcasting in the above manner will increasingly flourish in the future.

As described above, there is extreme importance in a technology in which various-mode multimedia information, from audio visual contents to computer software, can efficiently be distributed to nationwide and worldwide users by using a combination of the broad-area multicast-ability of the broadcasting medium and the bidirectional property of the computer network, in a given background of the present circumstances in which the boundary between the broadcasting medium and the computer network is in process of disappearing. According to the above-described data distribution system, an efficient and highly reliable multicast service can be provided to a great number of users.

When radio is used as the broadcasting link 2, the receivers 3 may be installed in a room, or in a so-called portable-type device like a mobile computer.

In addition, according to the above-described data distribution system, the data distribution may be either free or chargeable, and users to be charged and users not to be charged may be mixed. Although the data distribution can be performed regardless of the number of the receivers 3, the present invention is particularly effective when the number of the receivers 3 is large.

What is claimed is:

1. A transmitter for transmitting data to one or more receivers via a network capable of multicast, said transmitter comprising:

transmitting means for multicast transmitting said data via said network;

receiving means for receiving only retransmission requests for requesting the retransmission of said data, said retransmission requests being transmitted from said receivers;

totaling means for establishing a logical total of the retransmission requests received by said receiving means to eliminate duplicative retransmission requests; and control means for controlling said transmitting means to retransmit said data by multicast on said network, the retransmission of which is requested, based on the total from said totaling means.

2. A transmitter according to claim 1, wherein said retransmission requests are transmitted via a transmission medium capable of at least transmission from said receivers to said receiving means.

3. A transmitter according to claim 2, wherein said transmission medium comprises a network capable of bidirectional communication between said receivers and said receiving means.

4. A transmitter according to claim 1, said transmitter further comprising packet-forming means for transforming said data into packets in predetermined units, wherein said transmitting means transmits said packets;

said receiving means receives said retransmission requests for said packets;

said totaling means totals said retransmission requests in said data units; and said control means controls said transmitting means to retransmit all of said packets which are requested by said one or more receivers to be retransmitted.

5. A transmitter according to claim 4, wherein said receiving means receives said retransmission requests for said packets transmitted in said data units from said receivers.

6. A transmitter according to claim 4, wherein said packet-forming means forms Internet protocol packets.

7. A transmitter according to claim 1, wherein said transmitting means repeatedly transmits said data a predetermined number of times or for a predetermined period.

8. A transmitter according to claim 1, wherein said transmitting means transmits said data in accordance with a predetermined schedule.

9. A transmitter according to claim 1, wherein said transmitting means transmits information needed for restoring said data before transmitting said data.

10. A transmitter according to claim 1, wherein said transmitting means transmits said data, based on a connectionless protocol for performing communication without confirming the receiving condition of each receiver.

11. A transmitter according to claim 10, wherein said connectionless protocol is a user datagram protocol.

12. A transmitter according to claim 1, wherein said retransmission requests are transmitted by said receivers, based on a connectionless protocol for performing communication without confirming the receiving condition of said receiving means.

13. A transmitter according to claim 12, wherein said connectionless protocol is a user datagram protocol.

14. A transmitting method for transmitting data to one or more receivers via a network capable of multicast, said transmitting method comprising:

multicast transmitting said data via said network;

receiving only retransmission requests for requesting the retransmission of said data when said retransmission requests are transmitted from said receivers;

totaling said retransmission requests to establish a logical total of the retransmission requests that eliminates duplicative retransmission requests; and retransmitting said data, the retransmission of which is requested, by multicast on said network, based on the total.

15. A receiver for receiving data transmitted via a network capable of multicast, said receiver including:

receiving means for receiving said data transmitted via said network;

verifying means for verifying whether or not said data have been successfully received; and transmitting means for transmitting a retransmission request to a transmitter having transmitted said data when said data is not received successfully, without transmitting an acknowledgement when said data is received successfully, wherein the receiving means is further operative for receiving a data retransmission arising from a logical total of the retransmission request and at least one additional retransmission request, wherein the logical total eliminates at least one duplicative retransmission request.

16. A receiver according to claim 15, wherein said retransmission request is transmitted via a transmission medium capable of at least transmission from said transmitting means to said transmitter.

17. A receiver according to claim 16, wherein said transmission medium comprises a network capable of bidirectional communication between said transmitting means and said transmitter.

18. A receiver according to claim 15, wherein said transmitter transmits said data in the form of one or more packets in predetermined data units, said receiving means receives said packets, said verifying means verifies whether or not said packets have been successfully received, said transmitting means transmits to said transmitter a retransmission request for said packets in said data units, and said receiver further comprises restoring means for transforming said packets to restore the original data.

19. A receiver according to claim 18, wherein said packets are Internet protocol packets.

20. A receiver according to claim 18, wherein, when said restoring means again receives the packets already successfully received, said restoring means deletes the packets already received.

21. A receiver according to claim 15, wherein said transmitting means transmits said retransmission request, based on a connectionless protocol for performing communication without confirming the receiving condition of said transmitter.

22. A receiver according to claim 21, wherein said connectionless protocol is a user datagram protocol.

23. A receiving method for receiving data transmitted via a network capable of multicast, said receiving method comprising the steps of:
receiving said data transmitted via said network;
verifying whether or not said data have been successfully received;
transmitting a retransmission request to a transmitter having transmitted said data when said data is not received successfully, without transmitting an acknowledgement when said data is received successfully; and
receiving a data retransmission arising from a logical total of the retransmission request and at least one additional retransmission request, wherein the logical total eliminates at least one duplicative retransmission request.

24. A transceiver comprising a transmitter for transmitting data via a network capable of multicast, and one or more receivers for receiving said data, in which said transmitter comprises:
data transmitting means for multicast transmitting said data via said network;
retransmission-request receiving means for receiving only retransmission requests for requesting the retransmission of said data, said retransmission requests being transmitted from said receivers;
totaling means for establishing a logical total of said retransmission requests received by said retransmission-request receiving means to eliminate duplicative retransmission requests; and
control means for controlling said data transmitting means to retransmit said data by multicast on said network, the retransmission of which is requested, based on the total from said totaling means, and at least one of said one or more receivers comprises:
data receiving means for receiving said data transmitted via said network;
verifying means for verifying whether or not said data have been successfully received; and
retransmission-request transmitting means for transmitting said retransmission requests to said transmitter when said data have not been successfully received.

25. A transmitting/receiving method for a transceiver composed of a transmitter for transmitting data via a network capable of multicast, and one or more receivers for receiving said data, in which said transmitting/receiving method causes said transmitter to perform the steps of:
multicast transmitting said data via said network;
receiving only retransmission requests when said retransmission requests for requesting the retransmission of said data are transmitted from said receivers;
totaling said retransmission requests to establish a logical total of the retransmission requests that eliminates duplicative retransmission requests; and
retransmitting said data by multicast on said network, the retransmission of which is requested, based on the total, and in which said transmitting/receiving method causes at least said one or more receivers to perform the steps of:
receiving said data transmitted via said network;
verifying whether or not said data have been successfully received; and transmitting said retransmission requests when said data have not been successfully received.

* * * * *